(12) United States Patent
Kondo et al.

(10) Patent No.: US 6,347,355 B1
(45) Date of Patent: Feb. 12, 2002

(54) NON-VOLATILE STORAGE, THE CONTROLLING METHOD, AND INFORMATION MEMORY MEDIUM

(75) Inventors: Yoshimasa Kondo, Matsumoto; Tsunenori Kimura, Shiojiri, both of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/497,476

(22) Filed: Feb. 4, 2000

(30) Foreign Application Priority Data

Feb. 5, 1999 (JP) .......................................... 11-028673

(51) Int. Cl.[7] .............................................. G06F 12/00
(52) U.S. Cl. ........................ 711/103; 711/115; 711/165; 711/170; 711/159; 365/218
(58) Field of Search ............................... 711/103, 115, 711/165, 159, 170; 365/218

(56) References Cited

U.S. PATENT DOCUMENTS

| | | | |
|---|---|---|---|
| 5,592,669 A | * | 1/1997 | Robinson et al. ........... 707/206 |
| 5,742,934 A | * | 4/1998 | Shinihara .................... 711/103 |
| 5,845,313 A | * | 12/1998 | Estakhri et al. ............. 711/103 |
| 5,860,124 A | * | 1/1999 | Matthews et al. .......... 711/165 |
| 5,890,188 A | * | 3/1999 | Okamoto et al. .............. 711/5 |

* cited by examiner

Primary Examiner—Hong Kim
(74) Attorney, Agent, or Firm—Oliff & Berridge, PLC

(57) ABSTRACT

A nonvolatile storage device is constructed so as to include a first storage device for storing data and management information thereof, a request receiving device for receiving a request for writing data at the location shown by a logical address, and an information obtaining device for obtaining the physical address corresponding to the logical address through the management information and for obtaining first management information to control the location when the location is used and second management information to control the location which is not yet used. The nonvolatile storage device further includes an area obtaining device for obtaining an area which is not yet used as an area to store third management information and fourth management information from the first storage device, second storage device for replacing the first physical address in the first management information with the second physical address and for storing the management information made to correspond to the area storing the fourth management information as the third management information, and a third storage device for replacing the second physical address in the second management information with the first physical address and for storing the first physical address as the fourth management information obtained through the area obtaining device.

7 Claims, 10 Drawing Sheets

NON-VOLATILE STORAGE, THE CONTROLLING METHOD, AND INFORMATION MEMORY MEDIUM

BACKGROUND OF THE INVENTION

1. Field of the Invention

The present invention relates to a nonvolatile storage device, a control method of the nonvolatile storage device, and an information recording medium in which the nonvolatile storage device is realized, and more particularly to a nonvolatile storage device in which data can be written through the conversion of logical addresses to physical addresses and in which management information of the data can be recovered when data writing is interrupted, a control method for the nonvolatile storage device, and an information recording medium in which a program for controlling the nonvolatile storage device is recorded.

Further, the present invention relates to memory cards such as ATA (AT Attachment) cards, SSFDC (Solid State Floppy Disk Card Forum) cards, etc. in which data storage locations can be designated in the same way as in hard disks and floppy disks, a control method for the memory cards, and an information recording medium in which a program for controlling the memory cards is recorded.

Further, the present invention relates to a nonvolatile storage device which is provided with a flash EEPROM (Electrically Erasable Programmable Read Only Memory) and a RAM (Random Access Memory), in which a translation table for translating logical addresses designated as requested to read and write data into physical addresses in the flash EEPROM is divided and stored in the flash EEPROM and the RAM, and in which the translation table is prepared in the RAM based on the data of the translation table stored in the flash EEPROM, a control method for the nonvolatile storage device, and an information recording medium in which a program for controlling the nonvolatile storage device is recorded.

2. Description of the Related Art

Memory cards such as ATA cards, SSFDC cards, etc., as nonvolatile storage devices, are becoming wide spread as external storage devices of computers, and standardization of their specifications is in progress.

In particular, memory cards according to the PC (Personal Computer) card standard or the PCMCIA (Personal Computer Memory Card International Association) standard operate as an external storage device when they are connected to their host computers, and when the memory cards are disconnected from their host computers, they can be moved and carried alone with the data stored therein. Even if their host computers are powered on, hot connection and disconnection are possible. Because of such advantages, memory cards such as ATA cards, etc. are widely used as a means to record photograph data taken by digital cameras, etc. and to transfer the data to their host computers.

When memory cards such as ATA cards, SSFDC cards, etc. are requested to write and read data by their host computers to which the memory cards are connected, it is required to designate storage locations for the data. When the storage locations are designated, integers called logical addresses are used. Logical addresses are also used to designate storage locations when writing to and reading from hard disks and floppy disks are performed. Further, there are cases where the logical addresses are called logical block addresses.

For example, in accessing hard disks, as high-speed processing is possible when a certain amount of data such as 512 bytes of data are handled together, writing and reading are performed in units of a sector containing 512 bytes. Storage locations in actual hard disks are designated by a cylinder number, head number, sector number, etc., but in order to standardize the processing of reading and writing, the storage areas of hard disks are virtually arranged in a straight line and divided in sector units from the beginning, and they are numbered. These numbers mean logical addresses. In the case of floppy disks, logical addresses can be defined in the same way.

In host computers, logical addresses are used to access hard disks, etc., and therefore, when such a designating method of storage locations is made available to memory cards such as ATA cards, SSFDC cards, etc., it is useful in development of applications and data management. Therefore, in such memory cards, control is required so as to be able to designate storage locations using logical addresses.

Further, also when memory cards are connected to the above-mentioned digital cameras, logical addresses are used to designate storage locations in order that the digital cameras request the memory cards to write and read data. That is, the digital cameras operate as the above-mentioned host computer.

Now, such memory cards are realized because of nonvolatile storage devices, flash EEPROMs in particular, contained therein. The storage area of the flash EEPROMs is divided into one or a plurality of blocks, each block is divided into one or a plurality of pages, and each page is composed of a storage area in which the same capacity as a unit in writing and reading from hard disks, etc., for example, 512 bytes, can be stored. Further, a type in which an additional redundant area, for example, a storage area of 16 bytes, is added on each page is also widely used. The former has a capacity of 512 bytes in one page and the latter has a capacity of 528 bytes in one page, but it is common to both that the same 512 bytes of data, as a unit in reading and writing by host computers, can be stored.

Locations of the storage areas in flash EEPROMs can be uniquely identified by designating a chip number, block number in the chip, and page number in the block. Then, the storage areas in the flash EEPROMs are virtually arranged in a straight line and each page is sequentially numbered in units of pages from the beginning. These numbers are called physical addresses. That is, the locations in the storage areas in the flash EEPROMs can be designated by the physical addresses.

SUMMARY OF THE INVENTION

Flash EEPROMs are read-only memories which can be electrically erasable. That is, in principle, data can be written only once on electrically erased pages. Therefore, when it is required to change data stored on a certain page, firstly the page is erased and then new data are required to be written. Further, in flash EEPROMs, in order to decrease the number of elements and perform high-speed processing, the above-mentioned erasure is technically characterized in that it is carried out in units of block.

Further, some flash EEPROMs have a function of overwriting on their pages which already have data written thereon, on the redundant portions in particular. However, regarding such an overwriting function, the number of times of overwriting is limited in most cases. Further, there are also many flash EEPROMs which do not have the function of overwriting.

In such memory cards, by converting the logical addresses designated by their host computers into physical addresses, writing and reading from the pages located at the physical addresses are performed. However, because the writing is limited as described above, it is highly possible that the correspondence between the logical addresses and the physical addresses be frequently changed.

Up to now, a method of storing management information for making logical addresses correspond to physical addresses also in flash EEPROMs has been known. Further, in order to speed up reading and writing, a method which is provided for RAMs besides flash EEPROMs, in which an address translation table for translating logical addresses into physical addresses is stored, and in which when the correspondence between the logical addresses and the physical addresses is updated, the address translation table stored in the RAMs is also updated, has been proposed.

In such memory cards, memory cards according to the PC card standard in particular, hot unplugging is possible only when the writing process is not being performed, but there are cases where the memory cards are mistakenly pulled out by the user while the writing process is being performed. Further, when the memory cards are used as a storage device of digital cameras, etc., there are cases where power is turned off because of battery exhaustion during the writing process. In such cases, the demand for most appropriate adjustment of the management information for making logical addresses correspond to physical addresses and for the least amount of obstacles to the use of the memory cards is great.

In order to solve the above problems, it is an object of the present invention to provide a nonvolatile storage device in which data can be written through translation of logical addresses into physical addresses, and in which, when the operation of the data writing is interrupted, the management information of the data can be recovered, a control method for the nonvolatile storage device, and an information recording medium in which a program for controlling the nonvolatile storage device is recorded.

Further, it is an object of the present invention to provide memory cards such as ATA cards, SSFDC cards, etc. in which data storage locations can be designated in the same way as in hard disks and floppy disks, a control method for the memory cards, and an information recording medium in which a program for controlling the memory cards is recorded.

Further, it is an object of the present invention to provide a nonvolatile storage device which is provided with a flash EEPROM and a RAM, in which a translation table for translating logical addresses designated as requested to read and write data into physical addresses in the flash EEPROM is divided and stored in the flash EEPROM and the RAM, and in which the translation table is prepared in the RAM based on the translation table stored in the flash EEPROM, a control method for the nonvolatile storage device, and an information recording medium in which a program for controlling the nonvolatile storage device is recorded.

A first exemplary embodiment of this invention is a nonvolatile storage device, by including:
(a) a first storage device for storing data and management information that makes a logical address correspond to a physical address of the location of an area storing the data;
(b) a request receiving device for receiving a request for writing data at any location indicated by a logical address;
(c) an information obtaining device for obtaining the physical address corresponding to a logical address received by the request receiving device through the management information stored in the first storage device, and for obtaining first management information storing the management information to control the physical address when the location indicated by the first physical address is used and second management information storing the management information to control the second physical address of a location which is not yet used;
(d) an area obtaining device for obtaining, from the first storage device, an area which is not yet used as an area to store third management information and fourth management information;
(e) a second storage device for replacing the first physical address contained in the first management information obtained by the information obtaining device with the second physical address, and for storing management information made to correspond to the area storing the fourth management information obtained by the area obtaining device in the area storing the third management information obtained by the area obtaining device; and
(f) a third storage device for replacing the second physical address contained in the second management information obtained by the information obtaining device with the first physical address, and for storing the second physical address in the area storing the fourth management information obtained by the area obtaining device.

Moreover, "used" indicates both cases, that is, the case where the area is presently in use and the case where the area was used in the past and only obsolete data are stored therein at present, and accordingly, the area means "erasable" in flash EEPROMs. Hereinafter, the same applies.

FIG. 1 is a block diagram showing the outline of the first exemplary embodiment of this invention. In a nonvolatile storage device 10 according to the first exemplary embodiment of this invention:
the first storage device 11 stores data and management information that makes a logical address correspond to a physical address of the location of an area storing the data;
the request receiving device 12 receives a request for writing data at any location indicated by a logical address;
the information obtaining device—obtains the physical address corresponding to a logical address received by the request receiving device 12 through management information stored in the first storage device 11, and obtains first management information storing the management information to control the physical address when the location indicated by the first physical address is used and second management information storing the management information to control the second physical address of a location which is not yet used;
the area obtaining device 14 obtains, from the first storage device 11, an area which is not yet used as an area to store third management information and fourth management information;
the second storage device 15 replaces the first physical address contained in the first management information obtained by the information obtaining device 13 with the second physical address, and stores management information made to correspond to the area storing the fourth management information obtained by the area obtaining device in the area storing the third management information obtained by the area obtaining device 14; and the third storage device 16 replaces the second physical address contained in the second management information obtained by the information obtaining device 13 with the first physical address, and stores the second physical address in the area storing the fourth management information obtained by the area obtaining device 14.

According to the first exemplary embodiment of this invention, a nonvolatile storage device in which data can be written through the translation of logical addresses into physical addresses can be provided.

Further, a memory card such as an ATA card, SSFDC card, etc. in which storage locations of data can be designated in the same way as in hard disks and floppy disks can be provided.

A second exemplary embodiment of this invention is the nonvolatile storage device of the first exemplary embodiment of this invention, further including:

(g) a writing determining device for determining whether the fourth management information to be stored by the third storage device is stored in the area storing the fourth management information made to correspond to the third management information stored by the third management information storage means; and (h) information recovery device for replacing the second physical address contained in the second management information with the first physical address based on the first management information and the second management information to be stored in the first storage device when the writing determining device determined that no fourth management information is stored and for recovering the fourth management information by storing the second physical address in the area made to correspond to the third management information stored by the second storage device.

FIG. 2 shows a block diagram showing the outline of the second exemplary embodiment of this invention. Moreover, in FIG. 2, the elements having the same function as in FIG. 1 are given the same reference numerals.

In the second exemplary embodiment of this invention:

the writing determining device 17 determines whether the fourth management information to be stored by the third storage device is stored in the area storing the fourth management information made to correspond to the third management information stored by the second storage device 15; and the information recovery device 18 replaces the second physical address contained in the second management information with the first physical address based on the first management information and the second management information to be stored in the first storage device 11 when the writing determining device 17 determined that no fourth management information is stored and recovers the fourth management information by storing the second physical address in the area made to correspond to the third management information stored by the second storage device.

According to the second invention, a nonvolatile storage device can be provided in which, when the operation of writing data through the translation of logical addresses into physical addresses is interrupted, the management information of the data can be recovered.

A third exemplary embodiment of this invention is the nonvolatile storage device of the first exemplary embodiment of this invention or second exempleary embodiment of this invention, wherein the first storage device consist device comprises a nonvolatile storage device or a combination of the nonvolatile storage device and a volatile storage device.

According to the third exemplary embodiment of this invention, a nonvolatile storage device which is provided with a flash EEPROM and a RAM can be provided, in which a translation table for translating logical addresses to be designated as requested to read and write data into physical address in the flash EEPROM is divided and stored in the flash EEPROM and the RAM, and in which the translation table is prepared in the RAM based on the translation table stored in the flash EEPROM.

A fourth exemplary embodiment of this invention is a control method for a nonvolatile storage device provided with a storage device storing data and management information to make a logical address correspond to a physical address of the location of an area storing the data, the control method being including:

(a) a request receiving step for receiving a request for writing data at any location shown by a logical address;

(b) a before-writing information obtaining step for obtaining a physical address corresponding to the logical address received in the request receiving step through management information stored in the storage device and for obtaining first management information storing the management information to control the physical address when the location shown by the first physical address is used and second management information storing the management information to control a second physical address of a location which is not yet used;

(c) a new-area obtaining step for obtaining, from the storage device, an area which is not yet used as an area to store third management information and fourth management information;

(d) a third management information storage step for replacing the first physical address contained in the first management information obtained in the before-writing information obtaining step with the second physical address and for storing management information made to correspond to the area storing the fourth management information obtained in the new-area obtaining step in the area storing the third management information obtained in the new area obtaining step; and (e) a fourth management information storage step for replacing the second physical address contained in the second management information obtained by the before-writing information obtaining step with the first physical address and for storing the second physical address in the area storing the fourth management information obtained in the new-area obtaining step.

A fifth exemplary embodiment of this invention is a control method for the nonvolatile storage device as discussed a bove, further including:

(f) a writing determining step for determining whether the fourth management information to be stored in the fourth management information storage step is stored in the area to store the fourth management information made to correspond to the third management information stored in the third management information storage step; and (g) a fourth management information recovery step for replacing the second physical address contained in the second management information with the first physical address based on the first management information and the second management information stored in the storage device when the writing determining step determined that no fourth management information is stored, and for recovering the fourth management information by storing the first physical address in the area made to correspond to the third management information stored in the third management information storage step.

By executing a method according to the fourth and fifth exemplary embodiment of this invention on a nonvolatile storage device, a nonvolatile storage device according to the first through third exemplary embodiment of this invention can be provided. By this, the same effect as in the first through third exemplary embodiment of this invention is produced.

A sixth exemplary embodiment of this invention is an information recording medium in which is recorded a program for controlling a nonvolatile storage device provided with a storage device storing data and management information to make a logical address correspond to a physical address of the location of an area storing the data, the program including:

(a) a request receiving step for receiving a request for writing data at any location shown by a logical address;

(b) a before-writing information obtaining step for obtaining a physical address corresponding to the logical address received in said request receiving step through the management information stored in the storage device and for obtaining first management information storing management information to control the physical address when the location shown by the first physical address is used and second management information storing management information to control the second physical address of a location which is not yet used;

(c) a new-area obtaining step for obtaining, from the storage device, an area which is not yet used as an area to store third management information and fourth management information;

(d) a third management information storage step for replacing the first physical address contained in the first management information obtained in the before-writing information obtaining step with the second physical address, and for storing management information made to correspond to the area storing the fourth management information obtained in the new-area obtaining step in the area storing the third management information obtained in the new area obtaining step; and (e) a fourth management information storage step for replacing the second physical address contained in the second management information obtained in the before-writing information obtaining step with the first physical address, and for storing the first physical address in the area storing the fourth management information obtained in the new-area obtaining step.

A seventh exemplary embodiment of this invention is an information recording medium recording a program for controlling the nonvolatile storage device as discussed above, the program further including:

(f) a writing determining step for determining whether the fourth management information to be stored in the fourth management information storage step is stored in the area storing the fourth management information made to correspond to the third management information stored in the third management information storage step, and (g) a fourth management information recovery step for replacing the second physical address contained in the second management information with the first physical address based on the first management information and the second management information stored in the storage device when the writing determining step determines that no fourth management information is stored and for recovering the fourth management information by storing the first physical address in the area made to correspond to the third management information stored in the third management information storage step.

According to the sixth and seventh exemplary embodiment of this invention, by using an information recording medium recording these programs, these programs become products to be easily distributed and sold separately from the nonvolatile storage devices. Further, when the programs recorded in an information recording medium of the present invention are executed on nonvolatile storage devices, a nonvolatile storage device according to the first through third exemplary embodiment of this invention, and a control method of a nonvolatile storage device according to the fourth or fifth examplary embodiment of this invention can be fulfilled, and the same result as in these exemplary embodiments can be obtained.

DETAILED DESCRIPTION OF PREFERRED EMBODIMENTS

Hereinafter, an embodiment of the present invention is described. Moreover, the present embodiment is to describe the present invention and is not intended to limit the scope of the present invention. Therefore, it is possible for one skilled in the art to adopt embodiments where each of the elements can be replaced with an equivalent one, and these embodiments are included in the scope of the present invention.

Further, it is possible for logical addresses and physical addresses to be managed in units of any data size such as one sector (512 bytes), a sector group (a plurality of sectors), one page (512 bytes, or 528 bytes including a redundant portion), one block (a plurality of pages), etc., and the logical address unit and the physical address unit may be different from each other. These embodiments are also contained in the scope of the present invention.

Figure 1:
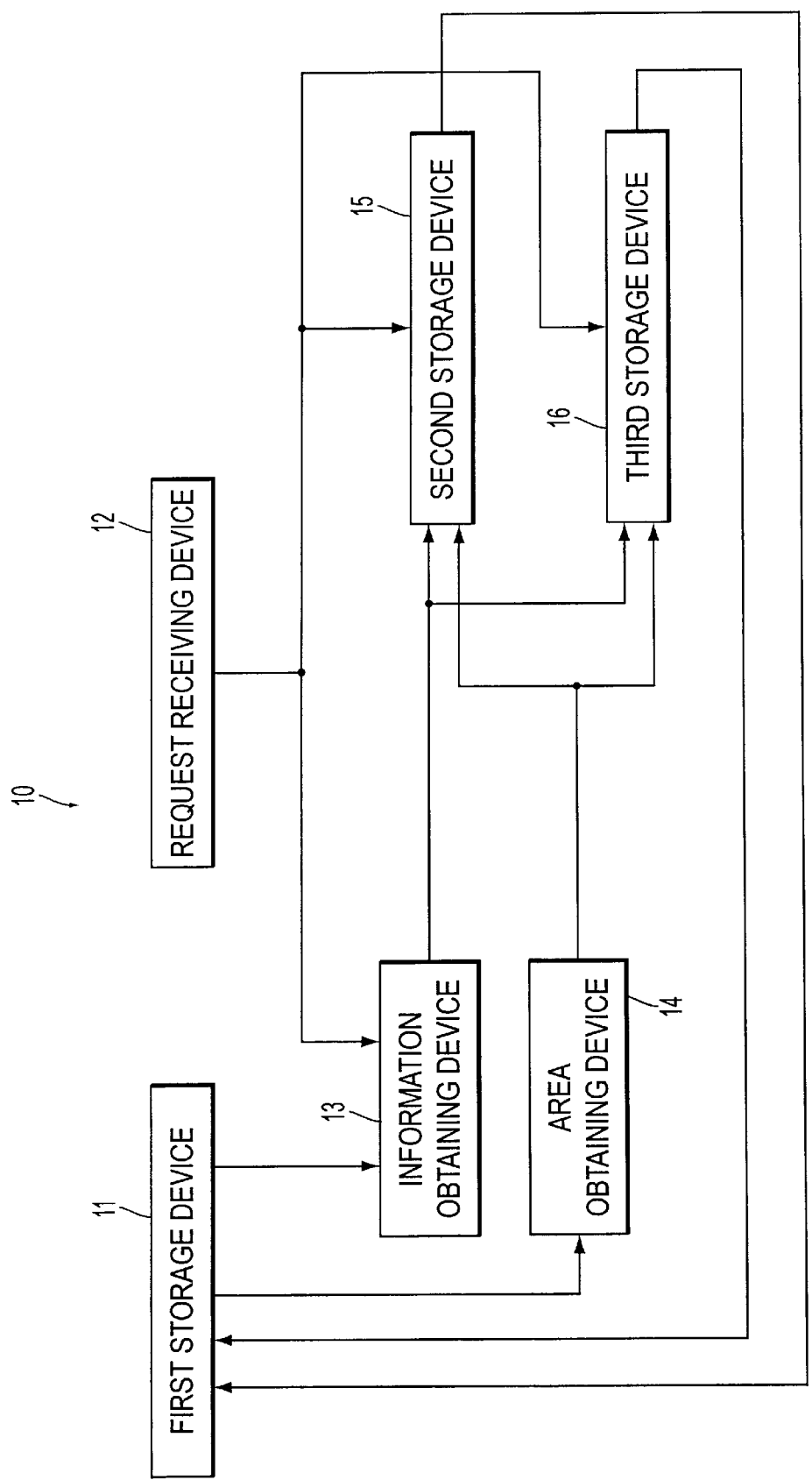
FIG. 1 is a block diagram showing the outline of a nonvolatile storage device of a first exemplary embodiment of this invention.
Figure 2:
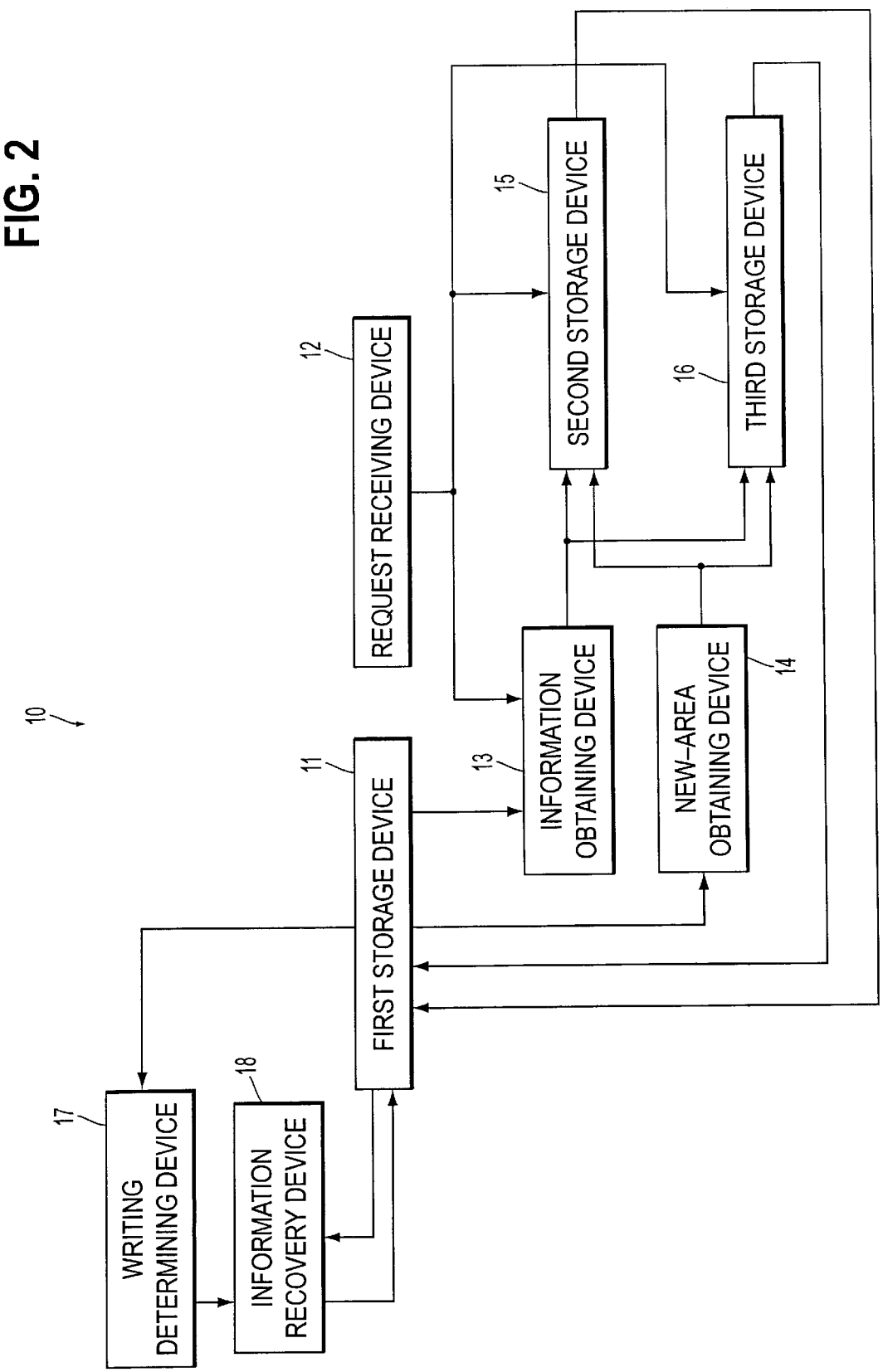
FIG. 2 is a block diagram showing the outline of a nonvolatile storage device of a second exemplary embodiment of this invention.
Figure 3:
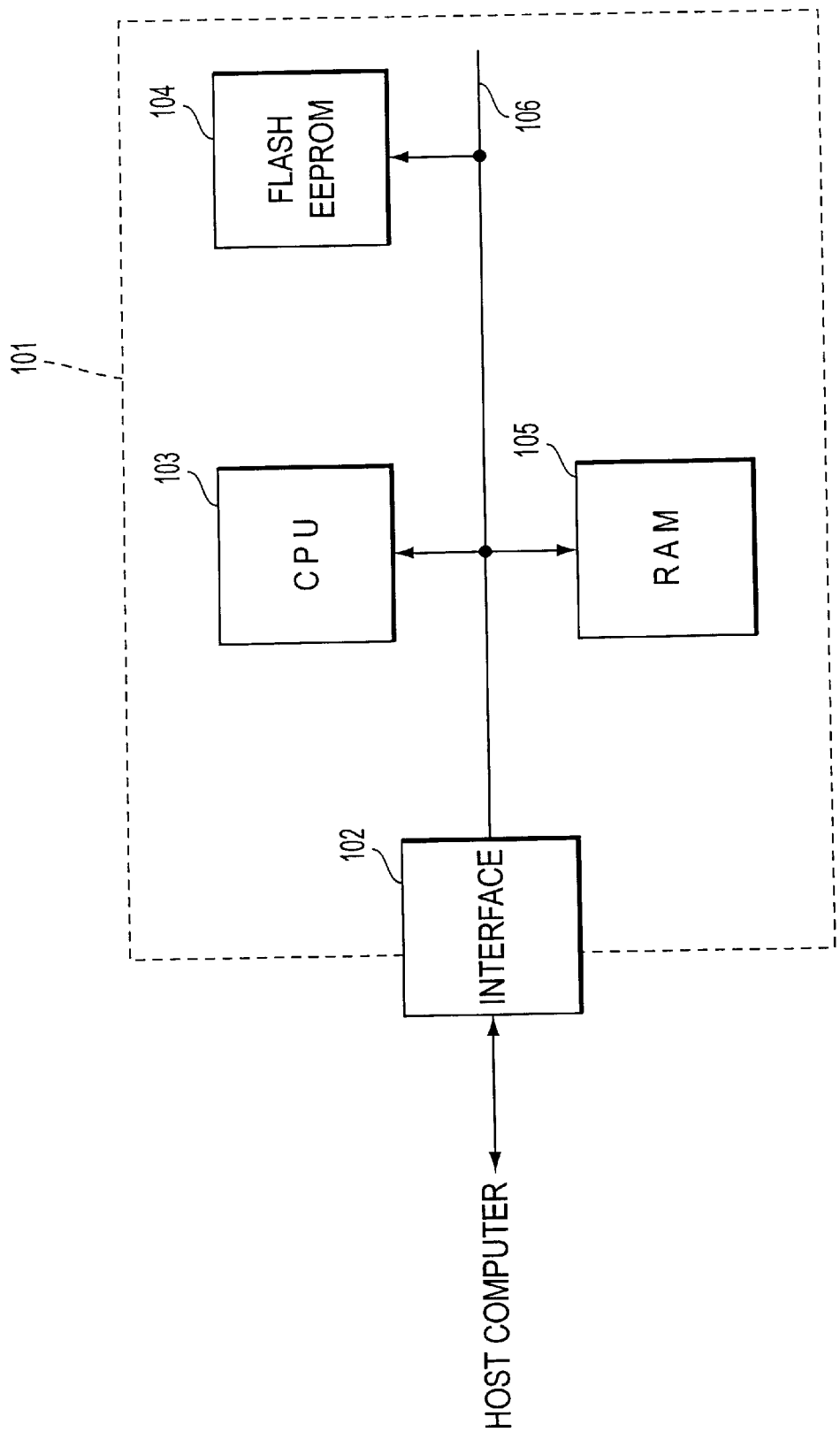
FIG. 3 is a block diagram showing the basic construction of a nonvolatile storage device (memory card) of the present invention.

FIG. 3 is a block diagram showing the basic construction of a nonvolatile storage device (memory card) according to the present invention. A memory card 101 is provided with an interface 102, a CPU 103, a flash EEPROM 104, and a RAM 105, and these are connected through a bus 106.

The interface 102 receives requests for writing and reading data sent by a host computer, and sends the response to these requests to the host computer. Further, it is possible to supply power from the host computer through the interface 102. Further, when the memory card 101 is composed of an ATA card, the interface 102 has the construction and shape according to the PC card (PCMCIA) standard.

When the memory card 101 is connected to the host computer and the power supply starts, the CPU 103 prepares a first address translation table based on a second address translation table stored in the flash EEPROM 104, and the first address translation table is stored in the RAM 105.

Further, when the processing of writing and reading data is performed between the memory card 101 and the host computer, the data transfer can be sped up by buffering data being transferred using the RAM.

Further, after the CPU 103 has made an image of data to be practically written on each page of the flash EEPROM, for example, an image of 528 bytes inside the RAM 105, the CPU 103 writes this together on a desired page in the flash EEPROM 104. At this time, high-speed data transfer can be realized by a DMA (Direct Memory Access) transfer device (not illustrated) contained in the CPU 103 through the bus 106.

Moreover, by separately preparing a RAM to be used for buffering for data transfer and by connecting the RAM to the bus 106, the RAM can be made to be a different chip from the RAM 105 storing the first address translation table.

Each page in the flash EEPROM 104 can be classified as a page mainly storing data written by the host computer, or as a page storing the second address translation table.

Further, the CPU 103 is provided with a program ROM (not illustrated). In this program ROM, a program for controlling the memory card is recorded, and when the power is turned on, the CPU 103 is loaded with the program recorded in the program ROM, and after the loading, the CPU 103 continues to execute the memory card control program. When the program ROM is replaced with an EEPROM, by storing another memory card control program which is separately distributed, updating of the new program is possible.

Further, the CPU 103 provided with a RAM such as a register, cache, memory, etc. inside can be used as a temporary storage area. Because the reading and writing in the storage area does not require the use of the bus 106, higher-speed processing can be performed.

Here, the flash EEPROM 104 and the RAM 105, which store the first address translation table and the second address translation table and which also store data in the area controlled by both the table, function as a first storage device 11.

The interface 102 functions as a request receiving device 12.

The CPU 103 working together with the flash EEPROM 104 and the RAM 105 functions as an information obtaining device 13, an-area obtaining device 14, third management information storage device 15, third storage device 16, a writing determining device 17, and an information recovery device 18.

Figure 4:
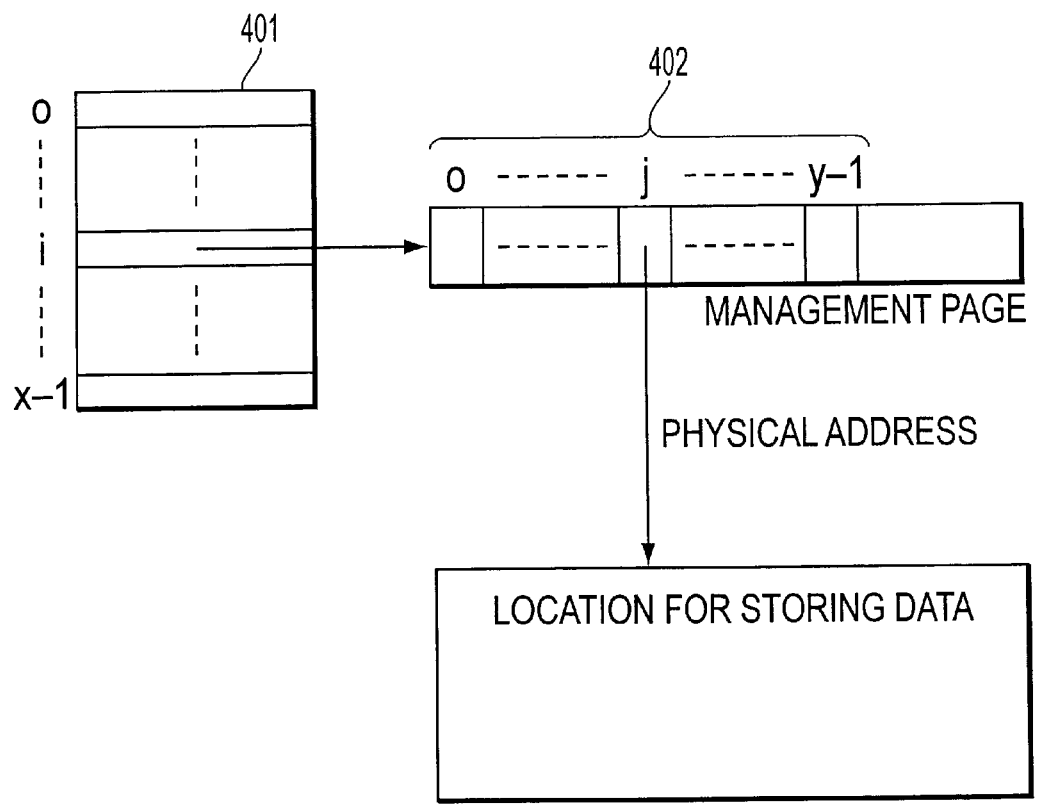
FIG. 4 is an illustration showing the storage configuration of management information of a nonvolatile storage device (memory card) of the present invention.
Figure 4:
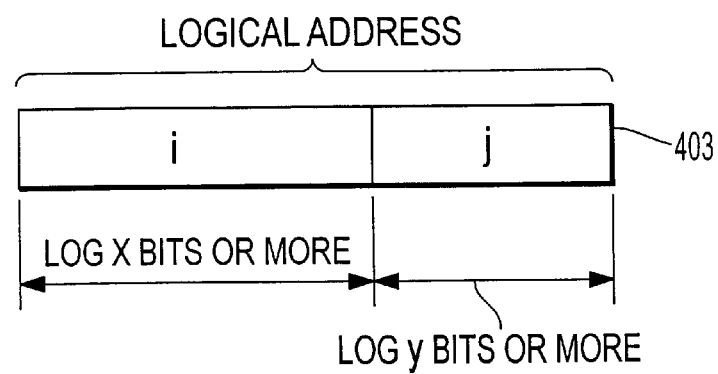

FIG. 4 shows the construction of a table storing the correspondence between logical addresses and physical addresses of an embodiment of a nonvolatile storage device (memory card) according to the present invention.

The RAM 105 stores a first address translation table 401 and the flash EEPROM 104 stores a second address translation table 402 to which each item in the first address translation table makes reference.

In the present embodiment, as the address translation table is divided into two stages, the logical address 403 is divided into the same number as the number of stages, that is, it is divided into two bit strings. The two bit strings are designated, for example, as i and j from the higher order to lower order.

When the first address translation table 401 is stored in the form of an array (number of elements is x) in the RAM 105, the bit string i requires a number of bits which can express the number of elements x.
That is, $i \geq \log x,$ where the base of the logarithm is two.

When each entry of the second address translation table 402 is stored in the form of an array (number of elements is y) in the flash EEPROM 104, the bit string j requires a number of bits which can express the number of elements y.
That is, $j \geq \log y.$ Each entry of the second address translation table 402 can be set for a size which fits into one page of the flash EEPROM 104. Moreover, although this one page is called a "management page" for convenience, the size of the management page is not limited to one page of the flash EEPROM, and may be a plurality of bytes, a plurality of pages, a block, or a plurality of blocks.

Figure 5:
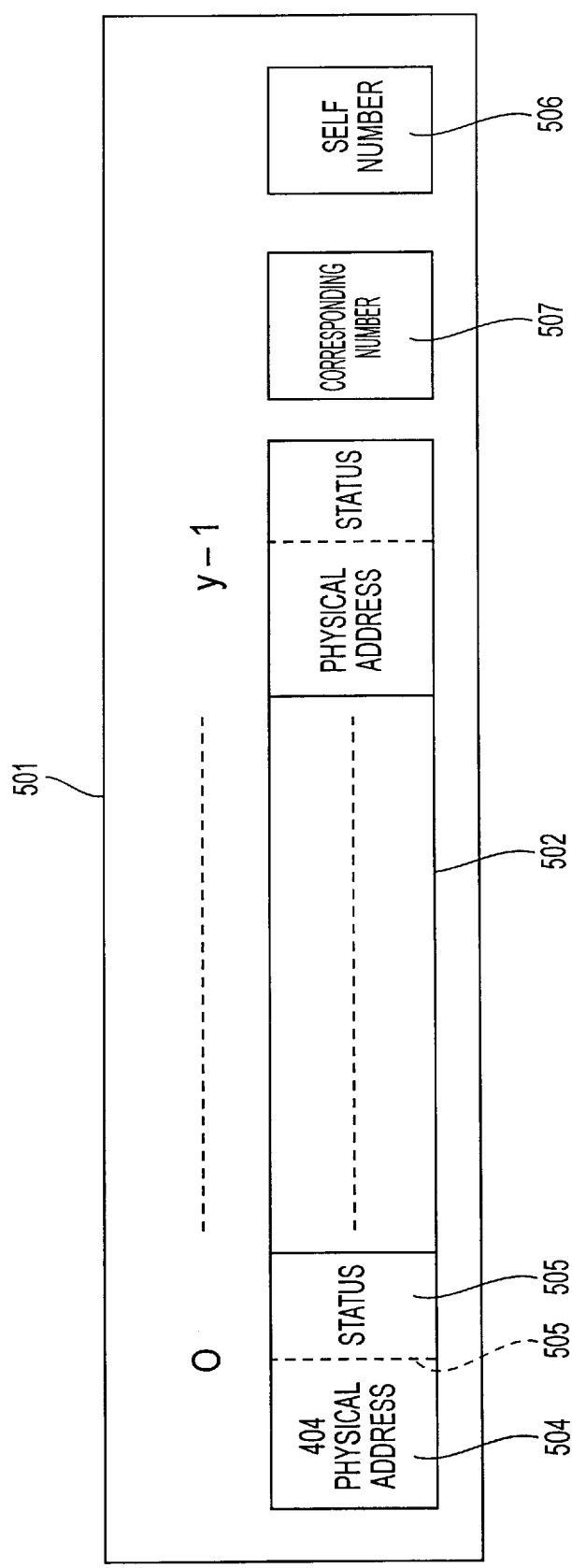
FIG. 5 is an illustration showing the configuration of a management page of a nonvolatile storage device (memory card) of the present invention.

FIG. 5 is an illustration showing the management page. The management page 501 is composed of one page of the flash EEPROM 104, and stores an array 502 having y number of elements. Each element 503 of the array contains the following data:
- a physical address area 504 storing physical addresses 404 corresponding to logical addresses 403; and
- a status area 505 storing flags indicating "in use" where effective data have been written at the physical address 404 and arc stored, "erasable" where old data have been written but the data are obsolete, or "usable" where the area has been erased.

Besides these, the management page 501 includes a self-number area 506 storing the higher-order value i of the logical addresses 403 controlled by the management page. Moreover, the higher-order value i is called "self-number".

Further, the management page 501 includes a corresponding number area 507 storing the self-number of a management page corresponding to the management page 501.

Moreover, a byte, page, block, a plurality of blocks, etc. can be considered as a unit for physical addresses 404 as described earlier, and the advantages of the present invention can be obtained by using any of them.

Figure 6:
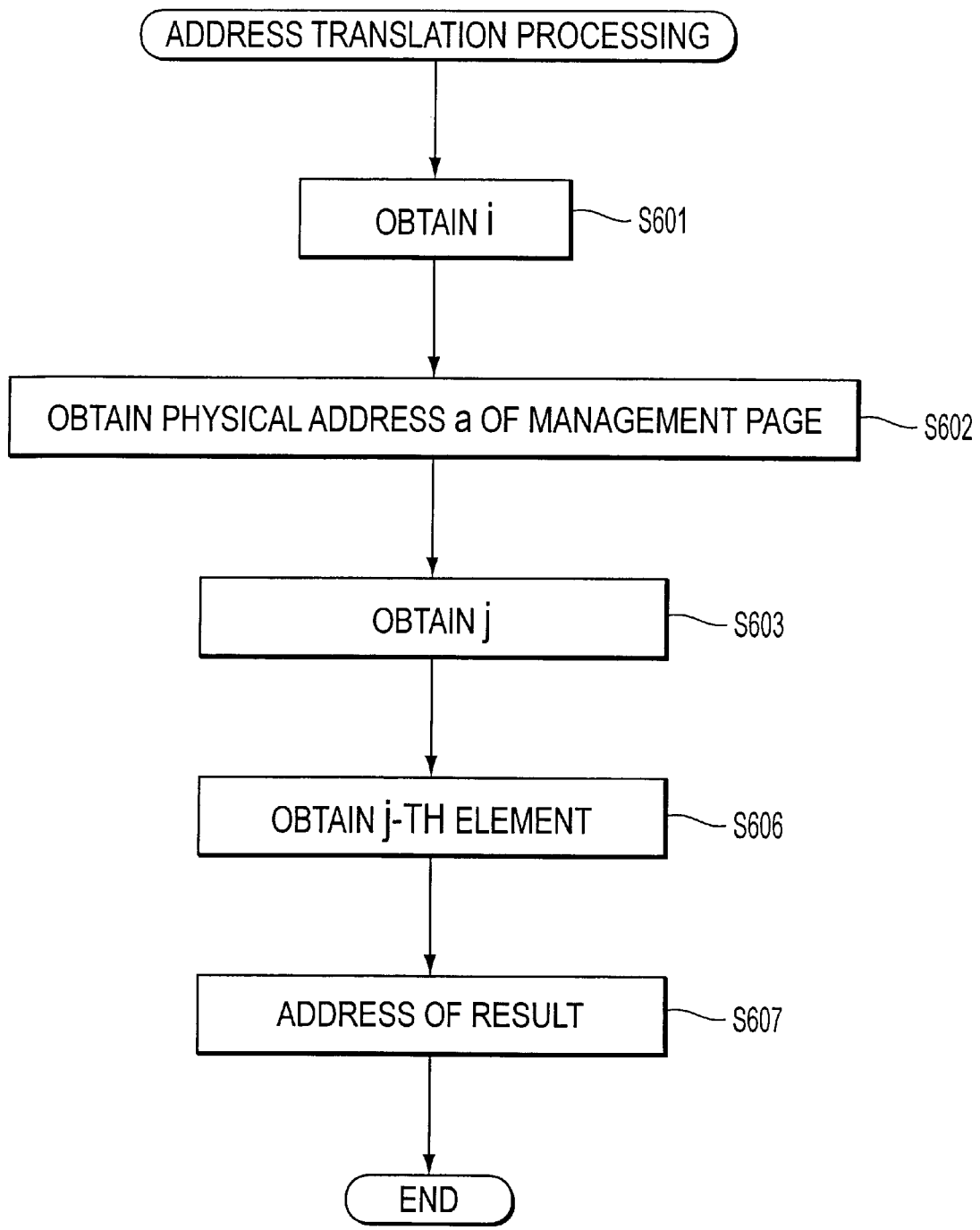
FIG. 6 is a flowchart showing a procedure of address translation processing of a nonvolatile storage device (memory card) of the present invention.
Figure 7:
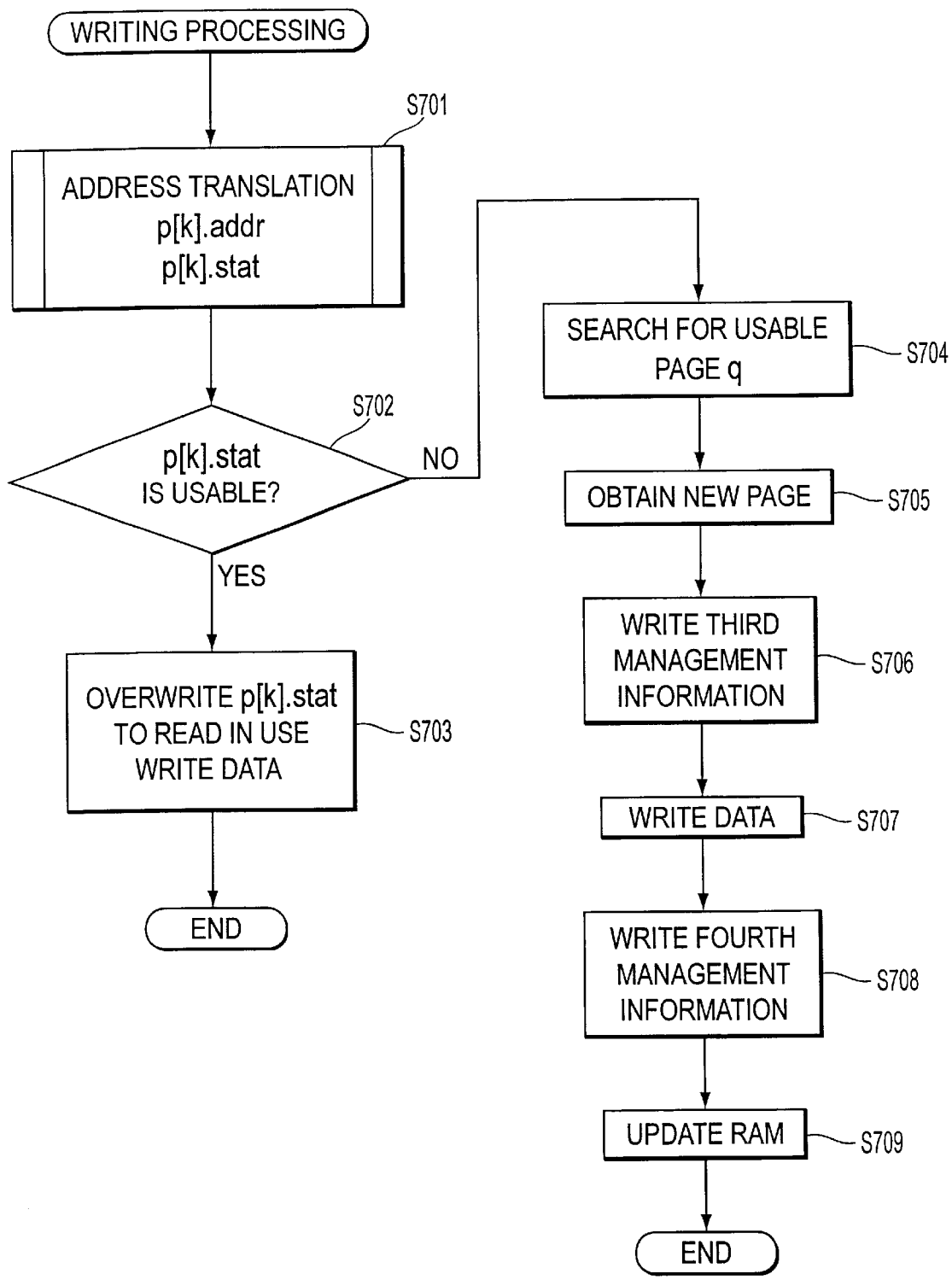
FIG. 7 is a flowchart showing a procedure of writing processing of a nonvolatile storage device (memory card) of the present invention.

Hereinafter, with reference to FIG. 6, the processing of address translation for translating logical addresses 403 into physical addresses 404 is described. FIG. 7 shows a flowchart concerning the procedure of the address translation processing. Moreover, the logical addresses 403 are mostly what are received by the interface 102 together with requests for writing and for reading, but these are not limited thereto.

First, the CPU 103 obtains the higher-order value i of the bit string of the logical address 403 (step S601).

Next, the CPU 103 obtains the i-th element in the array of the first address translation table 401 stored in the RAM 105 (step S602). This device the second address translation table 402, that is, a physical address a of a management page p. Moreover, even if the unit of the physical address a is any of a byte, page, block, and a plurality of blocks, the advantages of the present invention can be obtained. Further, the unit of the physical address a may be different from the unit of the physical address stored in the physical address area 504 of the management page 501.

Further, the CPU 103 obtains the lower-order value j of bit string of the logical address 403 (step S603).

Then the CPU 103 obtains the j-th element in the array of the obtained management page 501 (step S606).

In this way, the CPU 103 can obtain the resultant value of a physical address from the physical address area 504 of the obtained element (step S607), and the present processing is finished. Moreover, by looking at the status area 505 of the obtained element, it becomes clear whether the data stored at the appropriate physical address is effective or not.

When data are read out from a nonvolatile memory by designating a logical address, the data stored in a byte, byte-string, page, block, a plurality of blocks, etc. disposed at the physical address obtained by address translation processing may be read out.

As one of suitable embodiments, there are cases where logical addresses having the same size as the page of the flash EEPROM are given. Then, a value obtained by dividing the logical address by the number of pages per block defines a new "logical address". When the above address translation processing is carried out on the "logical address", the "physical address" to be obtained is in units of block. Further, a desired location (in units of pages) is defined as a page which is the "remainder obtained when the logical address is divided by the number of pages per block"-th page out of pages constituting the blocks shown by the obtained "physical address". According to this method, the size (number of bits) of each element of the array stored in the management page can be reduced.

In the following, the writing processing where data are written in a nonvolatile memory by designating logical addresses is described with reference to FIG. 7. FIG. 7 shows a flowchart of the writing processing.

First, the CPU 103, by the above-mentioned address translation processing, obtains a management page p controlling the area storing data corresponding to logical addresses, the k-th element p[k] in the array of the management page p, and the values of the physical address area p[k].addr and the status area p[k].stat of the element p[k] (step S701).

Next, the CPU 103 determines whether the value of p[k].stat is "usable" or not (step S702).

When the value is "usable" (step S702; Yes), the value of p[k].stat is overwritten with "in use", data is written at the physical address shown by the value of p[k].addr (step S703), and the present processing is finished. Here, the function of overwriting of the flash EEPROM can be utilized. Although there are many cases where the number of times for overwriting is limited, because in the present method overwriting is performed only once at most, no problems are caused.

Moreover, in step S703, if the value of p[k].stat is made "in use" and the other copied information is written using one page obtained which is not used yet, the same function can be performed without utilizing the function of overwriting.

On the other hand, when the value is not "usable" (step S702; No), any second address translation table is searched for a management page q where the information of the status area of any element of the array is "usable" (step S704). When this element is considered to be the h-th element, the value of q[h].stat is "usable", and the physical address shown by the value of q[h].addr makes reference to a byte, page, block, a plurality of pages, etc. of the flash EEPROM where writing is not performed after the data have been erased.

Here, the management page p is the management page where the first management information is stored, and the management page q is the management page where the second management information is stored.

Further, the CPU 103 obtains two pages which are not used yet (step S705). These are used as a management page s storing third management information and a management page t storing fourth management information.

When a new-area for management pages is obtained, it is desirable to obtain physical addresses in one direction from high-order to low-order or from low-order to high-order. Under such a configuration, lack of an area for management pages easily become clear. Moreover, when the area is lacking, garbage collection is carried out. For example, blocks where the status is "used" are erased and management pages are rearranged. In this way, an area for required new management paged is obtained.

When an area for management pages is made a fixed area, and when new management pages are obtained from the end of their addresses in order, if the physical address of the management page "obtained latest" is made available, all the management pages can be referred to. The physical address of the management page "obtained latest" is stored in the link area inside the flash EEPROM 104 and is used to prepare a first management table in the RAM 105 when the power is turned on. This is described later.

Next, the CPU 103 writes the following information in the management page s (step S706).

In the area ranging from the 0th element to the (y−1)th element s[u], when u≠k, p[u].addr is stored as the value of s[u].addr and p[u].stat is stored as the value of s[u].stat.

When u=k, q[h].addr is stored as the value of s[u].addr and "in use" is stored as the value of s[u].stat.

In the self-number area 506 in the management page s, the self-number of the management page s is stored.

In the corresponding number area 507 in the management page s, the self-number of the management page q is stored.

Moreover, the information of these is inseparably written together because of the characteristics of the flash EEPROM.

Further, the CPU writes data in the area shown by the physical address of q[h].addr (step S707).

Next, the CPU 103 writes the following information in the management page t (step S708).

In the area ranging from the 0th element to the (y−1)th element t[v] in the array of the management page t, when v≠h, q[v].addr is stored as the value of t[v].addr and q[v].stat is stored as the value of t[v].stat.

When v=h, p[k].addr is stored as the value of t[v].addr and "used" is stored as the value of t[v].stat.

In the self-number area 506 of the management page t, the self-number of the management page q is stored.

Moreover, the information of these is also inseparably written together because of the characteristics of the flash EEPROM.

Figure 8:
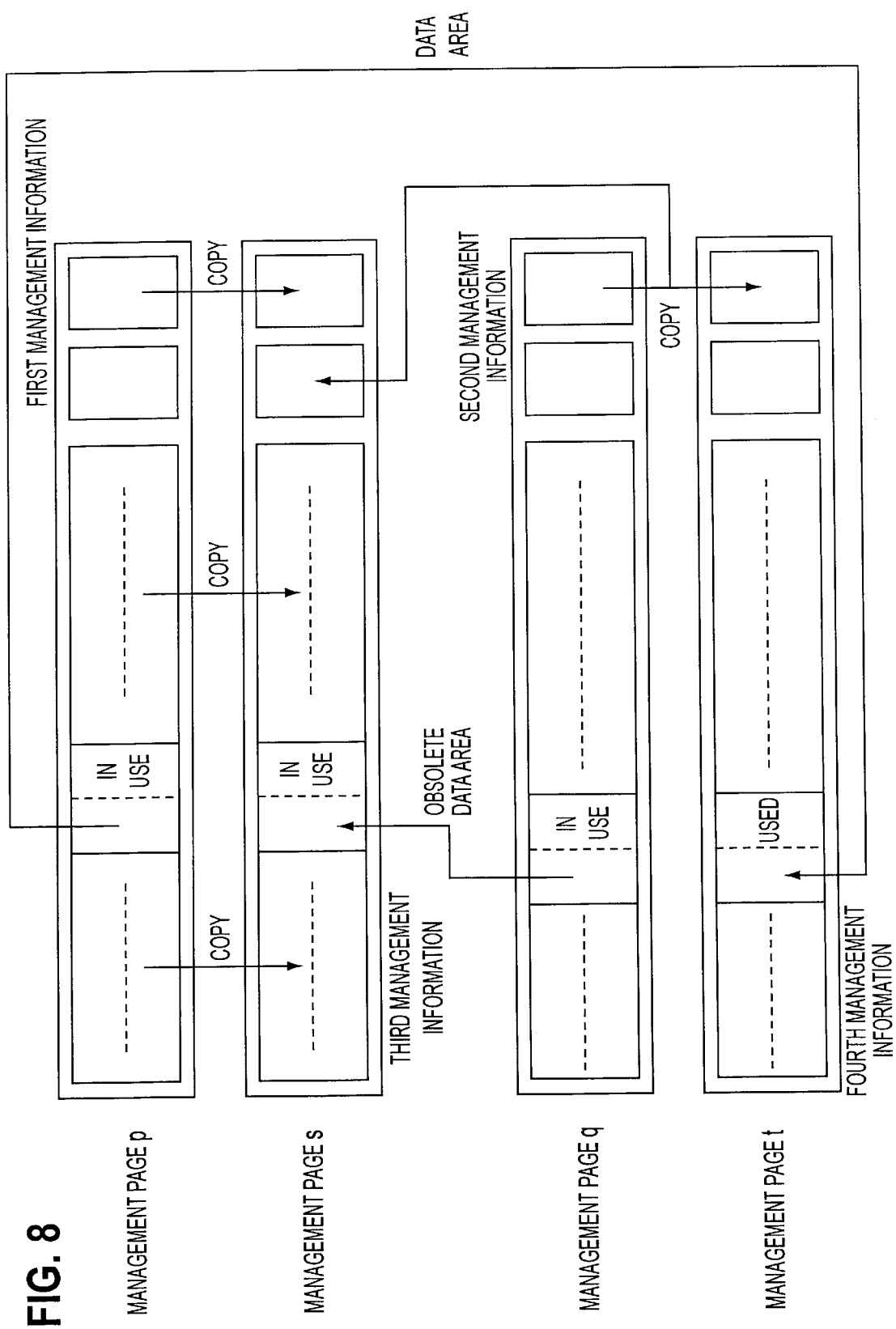
FIG. 8 is an illustration showing the configuration of a management page to be processed by writing processing of a nonvolatile storage device (memory card) of the present invention.

In FIG. 8, the outline of the management pages p, q, s, and t is shown. In the array of the management pages s and t, the values which are obtained when the elements p[k] and q[h] are exchanged in the array of the management pages p and q are stored.

In such a way that the corresponding number stored in the management page s is made to have the same value as the self-number of the management page t, the third management information and the fourth management information are made to correspond to each other.

Further, the combination of the management page p and management page s have the same self-number and the combination of the management page q and management page t have the same self-number. Because of this, the first management information can be obtained from the third management information, and the second management information from the fourth management information.

According to these, the corresponding number stored in the management page s device the self-number of the management page t, and accordingly the second management information can be obtained from the third management information. By utilizing these characteristics, the recovery processing to be described later is carried out.

Lastly, the CPU 103 updates the value of the i-th element in the array of the first management table to the physical address of the management page s, and updates the value of elements in the array which are required to make reference to the management page q to the physical address of the management page t (step S709).

In this way, the third management information functions as "information showing the start of data writing", and the fourth management information functions as "information showing the finish of data writing".

Figure 9:
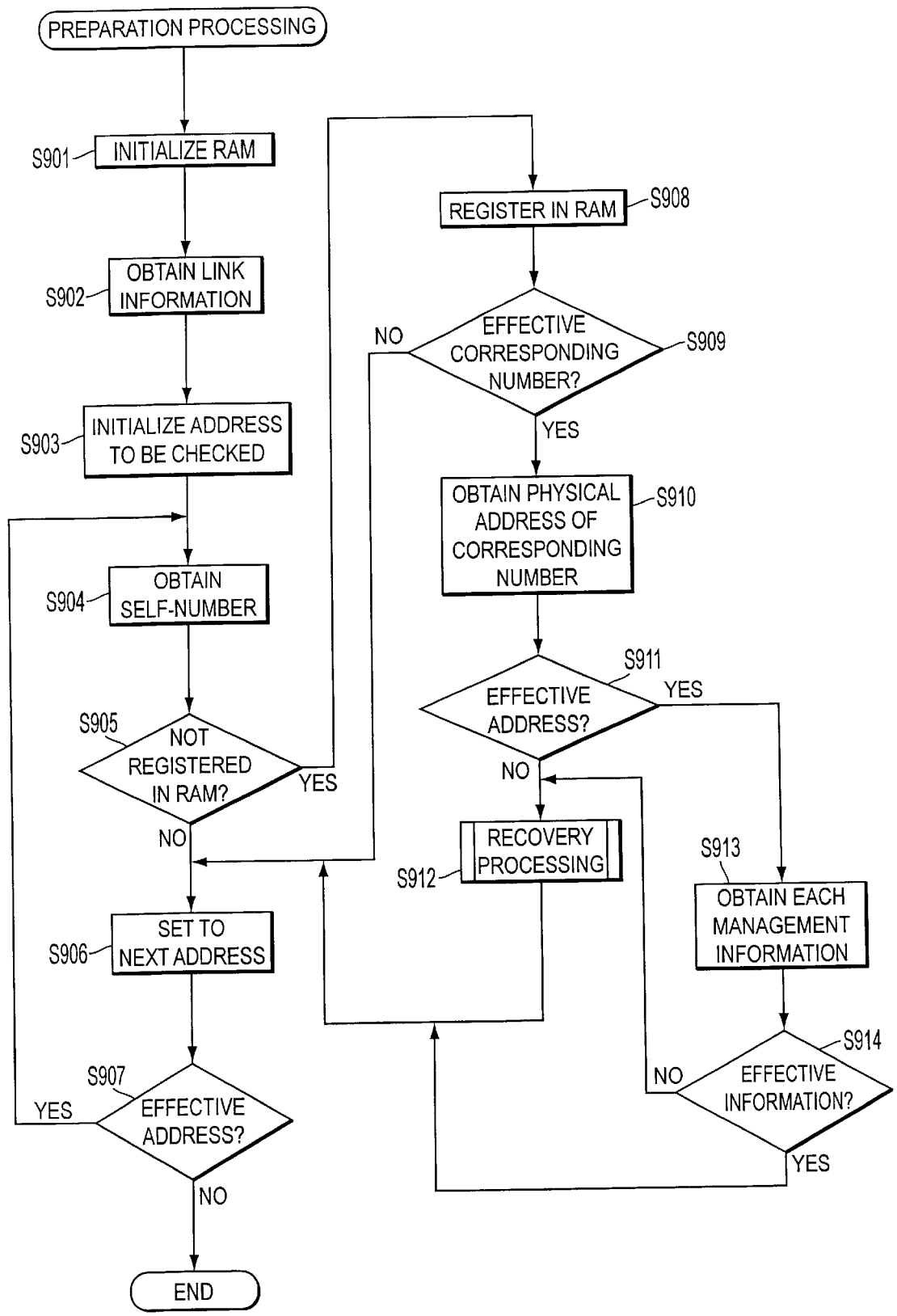
FIG. 9 is a flowchart showing a procedure of preparation processing of a first address translation table of a nonvolatile storage device (memory card) of the present invention.

FIG. 9 is a flowchart showing the procedure of preparation of a first address translation table of a nonvolatile storage device (memory card) of the present invention. At the time when the power is turned on and a reset signal is sent from the host computer, the preparation of the first address translation table starts.

First, the CPU 103 of the memory card sets the value of each element in the array of the first address translation table to a value not existing as a physical address, for example, −1 (step S901). By looking at whether the value is −1 or not, it can be determined whether the corresponding element of the first address translation table is prepared or not.

Next, the CPU 103 of the memory card reads the value of a physical address stored in a fixed link area of the flash EEPROM 104 (step S902). From this value, the lowest-order physical address and the highest-order physical address of the management page storing a second address translation table can be obtained. By searching the management page from one of the addresses to the other, a first address translation table can be prepared.

Next, the address of the management page to be searched is set to be, for example, the highest-order physical address obtained in step S901 (step S903). In this case, the address of the management page to be processed next is obtained by decrementing the physical address.

Further, the CPU 103 obtains the self-number stored in the self-number area from the information stored in the management page (step S904).

Next, the CPU 103 searches for the value stored in the "self-number"-th element obtained by step S904 from the array of the first address translation table and determines whether the value is −1 or not (step S905).

When the value is not −1 (step S905; No), the management information stored in the management page is obsolete, and this device that the control is maintained by a new management page. Then, the address of the management page to be processed next is decremented (step S906) to determine whether the address as a physical address of the management page is effective or not, and when the address is effective (step S907; Yes) the procedure returns to step S904. When the address is not effective (step S907; No), the preparation of the first address translation table is finished.

On the other hand, when the value is −1 (step S905; Yes), this device that the management page is the latest of the management pages controlling the self-numbers. Then, in the "self-number"-th element obtained in step S904, of the array of the first address translation table, the physical address of the management page is stored (step S908).

Further, the corresponding number stored in the corresponding number area of the appropriate management page is searched for to determine whether the value as the self-number is effective or not (step S909).

When the value of the corresponding number is not effective as a self-number (step S909; No), this device that the management page stores the fourth management information. Then, the processing of this management page is finished to return to step S906.

On the other hand, when the value of the corresponding number is effective as a self-number (step S909; Yes), this device that this management page stores the third management information. In that case, the value of the "corresponding number"-th element in the array of the first address translation table of the RAM 105 is obtained (step S910). Further, it is checked whether the value as a physical address of the management page is effective or not (step S911). When the value is not effective (step S911; No), because this device that the fourth management information is not stored, recovery processing is performed (step S912) and the processing of the management page is finished to return to step S906. Moreover, the detail of the recovery processing is described later.

On the other hand, if the value is effective (step S911; Yes), the management information of the physical address is obtained from the flash EEPROM 104. This corresponds to the fourth management information. Further, from the self-number of each of the third management information and the fourth management information, the first management information and the second management information stored in the flash EEPROM 104 are obtained (step S913).

Further, these four pieces of management information are compared to check whether the fourth management information is effective or not (step S914).

As described earlier, when it is effective:
  most of the first management information and the third management information are common;
  most of the second management information and the fourth management information are common; and
  in the above two combinations, the information portions which are not common have a relationship in which the values are exchanged between them.
The situation is as shown in FIG. 8.

When the fourth management information is effective (step S914; Yes), the procedure returns to step S906.

When the fourth management information is not effective (step S914; No), recovery processing is performed (step S912) and the procedure returns to step S906. The recovery processing is described below.

Figure 10:
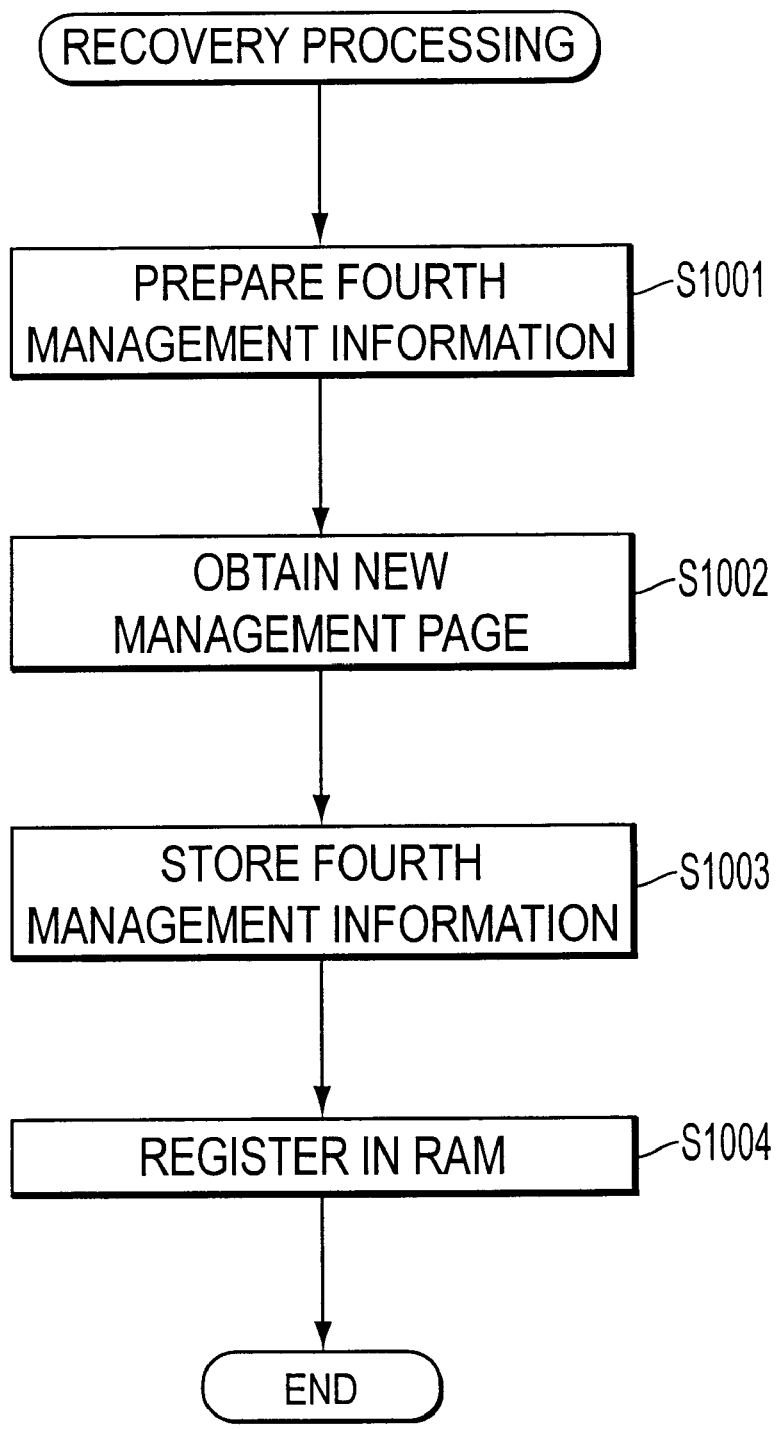
FIG. 10 is a flowchart showing a procedure of preparation processing of a second address translation table of a nonvolatile storage device (memory card) of the present invention.

FIG. 10 is a flowchart showing the procedure of recovery processing of a second address translation table of a nonvolatile storage device of the present invention.

First, the CPU 103 compiles the fourth management information in the RAM 105 based on the first through third management information (step S1001). As shown in FIG. 8, from the first through third management information, the fourth management information can be compiled.

Next, a new management page is obtained (step S1002), and the fourth management information is stored on the page (step S1003).

Further, the physical addresses of the page are stored as an element in the array of the corresponding RAM 105 (step S1004), and the present processing is finished.

Moreover, in the above embodiments, the determination of whether recovery processing is started or not is made when the latest page of each "self-number" is obtained, but the following embodiment can be adopted.

That is, a plurality of blocks, all of which are linked and used for management, are searched for only the latest page having the physical address value stored in the link area, and only this page is used for determination. The reason why such an embodiment can be realized is that even if an interruption, such as switching off the power, occurs at any time, only the management page storing the latest second address translation table at that time is influenced by the interruption.

Therefore, in the embodiment, at the start of the preparation processing of the first address translation table which is performed when the memory card is actuated, the determination and recovery are performed only once.

ADVANTAGES

Firstly, a nonvolatile storage device in which data can be written through the translation of logical addresses into physical addresses can be provided, and a control method thereof can be provided.

Further, a memory card such as an ATA card, SSFDC, etc. in which data storage locations can be designated in the same way as in hard disks and floppy disks can be provided, and a control method thereof can be provided.

Secondly, a nonvolatile storage device can be provided in which, when the operation of writing data through the translation of logical addresses into physical addresses is interrupted, the management information of the data can be recovered, and a control method thereof can be provided.

Thirdly, a nonvolatile storage device which is provided with a flash EEPROM and a RAM can be provided, in which a translation table for translating logical addresses required to read and write data into physical addresses in the flash EEPROM is divided and stored in the flash EEPROM and the RAM, and in which, based on the translation table stored in the flash EEPROM, the translation table is prepared in the RAM, and a control method thereof can be provided.

Fourthly, by using an information recording medium recording the program realizing the control, the medium is made to be easily distributed and sold separately from the nonvolatile storage device. When the program recorded in an information recording medium of the present invention is executed on nonvolatile storage devices, a nonvolatile storage device according to the above inventions and a control method of the nonvolatile storage device according to the above invention can be fulfilled, and in the same way the above result can be obtained.

What is claimed is:

1. A nonvolatile storage device, comprising:

(a) a first storage device that stores data and management information for making a logical address correspond to a physical address of a location of an area storing the data;

(b) a request receiving device that receives a request for writing data at a location indicated by a logical address;

(c) an information obtaining device that obtains a physical address corresponding to the logical address received by said request receiving device through the management information stored in said first storage device and that obtains first management information storing management information to control the physical address when the location indicated by a first physical address is used and second management information storing the management information to control a second physical address of a location which is not yet used;

(d) an area obtaining device that obtains, from said first storage device, an area which is not yet used as an area to store third management information and fourth management information;

(e) a second storage device that replaces the first physical address contained in the first management information obtained by said information obtaining device with the second physical address and that stores management information made to correspond to the area storing the fourth management information obtained by said area obtaining device in the area storing the third management information obtained by said area obtaining device; and (f) a third information storage device that replaces the second physical address contained in the second management information obtained by said information obtaining device with the first physical address and that stores the second physical address in the area storing the fourth management information obtained by said area obtaining device.

2. The nonvolatile storage device as claimed in claim 1, further comprising:

(g) a writing determining device that determines whether the fourth management information to be stored by said third storage device is stored in the area storing the fourth management information made to correspond to the third management information stored by said second storage device; and (h) an information recovery device that replaces the second physical address contained in the second management information with the first physical address based on the first management information and the second management information to be stored in said first storage device when said writing determining device determines that no fourth management information is stored and that recovers the fourth management information by storing the second physical address in the area made to correspond to the third management information stored by said second storage device.

3. The nonvolatile storage device as claimed in claim 1, said first storage device comprising a nonvolatile storage device or a combination of the nonvolatile storage device and a volatile storage device.

4. A control method of a nonvolatile storage device provided with a storage device storing data and management information to make a logical address correspond to a physical address of a location of an area storing the data, said control method comprising:

(a) a request receiving step for receiving a request for writing data at a location shown by a logical address;

(b) a before-writing information obtaining step for obtaining, a physical address corresponding to the logical address received in said request receiving step through the management information stored in said storage device and for obtaining first management information storing management information to control the physical address when the location shown by a first physical address is used and second management information storing the management information to control a second physical address of a location which is not yet used;

(c) a new-area obtaining step for obtaining, from said storage device, an area which is not yet used as an area to store third management information and fourth management information;

(d) a third management information storage step for replacing the first physical address contained in the first management information obtained in said before-writing information obtaining step with the second physical address and for storing management information made to correspond to the area storing the fourth management information obtained in said new-area obtaining step in the area storing the third management information obtained in said new-area obtaining step; and (e) a fourth management information storage step for replacing the second physical address contained in the second management information obtained by said before-writing information obtaining step with the first physical address and for storing the second physical address in the area storing the fourth management information obtained in said new-area obtaining step.

5. The control method of a nonvolatile storage device as claimed in claim 4, further comprising:

(f) a writing determining step for determining whether the fourth management information to be stored in said fourth management information storage step is stored in the area to store the fourth management information made to correspond to the third management information stored in said third management information storage step; and (g) a fourth management information recovery step for replacing the second physical address contained in the second management information with the first physical address based on the first management information and the second management information stored in said storage device when said writing determining step determines that no fourth management information is stored and for recovering the fourth management information by storing the first physical address in the area made to correspond to the third management information stored in said third management information storage step.

6. An information recording medium in which is recorded a program for controlling a nonvolatile storage device provided with a storage device storing data and management information to make a logical address correspond to a physical address of a location of an area storing the data, the program comprising:

(a) a request receiving step for receiving a request for writing data at a location shown by a logical address;

(b) a before-writing information obtaining step for obtaining a physical address corresponding to the logical address received in said request receiving step through the management information stored in said storage device and for obtaining first management information storing management information to control the physical address when the location shown by a first physical address is used and second management information storing the management information to control a second physical address of a location which is not yet used;

(c) a new-area obtaining step for obtaining, from said storage device, an area which is not yet used as an area to store third management information and fourth management information;

(d) a third management information storage step for replacing the first physical address contained in the first management information obtained in said before-writing information obtaining step with the second physical address and for storing management information made to correspond to the area storing the fourth management information obtained in said new-area obtaining step in the area storing the third management information obtained in said new-area obtaining step; and (e) a fourth management information storage step for replacing the second physical address contained in the second management information obtained in said before-writing information obtaining step with the first physical address and for storing the first physical address in the area storing the fourth management information obtained in said new-area obtaining step.

7. The information recording medium recording a program controlling a nonvolatile storage device as claimed in claim 6, the program further comprising:

(f) a writing determining step for determining whether the fourth management information to be stored in said fourth management information storage step is stored in the area storing the fourth management information made to correspond to the third management information stored in said third management information storage step, and (g) a fourth management information recovery step for replacing the second physical address contained in the second management information with the first physical address based on the first management information and the second management information stored in said storage device when said writing determining step determines that no fourth management information is stored and for recovering the fourth management information by storing the first physical address in the area made to correspond to the third management information stored in said third management information storage step.

* * * * *